Patented Mar. 9, 1937

2,073,354

UNITED STATES PATENT OFFICE 2,073,354

RECOVERY OF HORMONES

Walter Schoeller, Berlin-Westend, and Karl Junkmann, Berlin, Germany, assignors to Schering-Kahlbaum A. G., Berlin, Germany No Drawing. Application October 18, 1932, Serial No. 638,344. In Germany October 23, 1931

8 Claims. (Cl. 167—74)

Our invention refers to hormones, more especially to those contained in the anterior lobe of the pituitary gland and has for one of its objects to provide means whereby one of these hormones can be recovered with particular ease.

Aron (Comptes Rendus de la Société de Biologie, vol 102 (1929), p. 682 to 684) has shown that watery extracts of the anterior lobe of the pituitary gland contain, besides other hormones, a substance which is distinguished by the particular action it exerts on the thyroid gland. This substance, which shall hereinafter be called "thyreotropic hormone", renders it possible to effect a development of the parenchym or solid cellular part of the thyroid gland and to cause shrinkage of the colloid or homogenous content of the cavities of the gland. In the extracts hitherto recovered this thyreotropic hormone was accompanied by other hormones and up till now it has not been possible to recover extracts containing the thyreotropic hormone, which did not act on the germinal glands.

We have now found that it is possible to separate the thyreotropic hormone from the gonadotropic hormone of the anterior lobe of the pituitary gland and to recover both these hormones separately, if watery or aqueous extracts or press juices of the pituitary gland, which have been produced at ordinary temperature and with any desired hydrogen ion concentration, are treated with an agent precipitating albumen, the precipitate thus obtained being freed from the precipitating agent and the waste liquors from these precipitations being treated for the recovery of the gonadotropic hormone.

The precipitate freed from the precipitating agent contains the thyreotropic hormone, which can be purified by repeating the precipitation with an agent for precipitating albumen and again freeing the precipitate from such agent.

As agents for precipitating albumen we may use picric acid, sulfo salicyclic acid, trichloro acetic acid, etc., salts of the heavy metals, such as acetate of lead, silver nitrate and mercuric chloride or colloids, such as for instance ferric hydroxide, alumina, etc., The precipitating agent is preferably removed from the precipitate with organic solvents. Thus picric acid, sulfo salicylic acid and trichloro acetic acid can be washed out by means of alcohol or ether, acetate of lead by means of a mixture of alcohol and of acetic acid. Precipitates produced with the aid of colloids, such as ferric hydroxide, are preferably dissolved in dilute acids, and from these solutions the thyreotropic hormone can be precipitated by means of agents capable of precipitating albumen, which are soluble in organic solvents.

Apart from repeated precipitation, preparations of particular purity can be produced by adjusting the watery or aqueous solutions of the precipitates, obtained with the aid of the agents capable of precipitating albumen, to the iso-electric point, thereby causing flocculation of inert matter of an albuminous nature. From this filtrate the thyreotropic hormone can then be recovered in a state of great purity by precipitation with an albumen-precipitating agent and removal of the precipitant.

In order to adjust a solution to the isoelectric point, the substance to be purified is dissolved in that quantity of acid which just suffices to effect solution. To the clear solution is slowly and drop by drop added dilute caustic alkali solution $$\left(\frac{n}{10} \text{ to } \frac{n}{1}\right)$$

whereby a gradually increasing precipitate is formed. The addition of caustic alkali is continued, until a filtered sample, to which some caustic alkali is added, remains clear. No excess of the precipitant should be added, since the precipitate would redissolve therein.

In a similar manner the isoelectric point may be ascertained from the alkaline side by adding to an alkaline solution of the substance $$\frac{n}{10} \text{ to } \frac{n}{1}$$

acid, until no further precipitate is formed.

The gonadotropic hormone of the anterior lobe of the pituitary gland, which is present in the filtrates of the precipitates, can be recovered for instance by salting out.

We may either start from extracts or from press juices of fresh pituitary glands. We prefer starting from dry powdered anterior lobes of the pituitary gland, which have been dried at low temperature and freed from fat by means of suitable solvents.

The efficiency of the thyreotropic hormone preparation thus obtained is ascertained in the following manner: guinea pigs, each weighing 100 to 150 grams, are treated in pairs during 3 days with the same quantity of the preparation. On the 4th day the animals are killed and the thyroid gland tested by histological means. We call a unit that smallest quantity, which, when administered daily on 3 consecutive days, produces in at least one of a pair of animals clear positive phenomena (rise and swelling of the cells of the follicle epithel, vacuolization and even shrinkage of the colloid contents, hyperaemia and in most cases an increase in size of the gland as a whole).

In practicing our invention, we may for instance proceed as follows:—

Example 1

100 grams fresh ground anterior lobes of the pituitary gland are shaken over night with 25 grams kieselguhr and 1500 ccms. of a 2% sodium bicarbonate solution. On the following day the mixture is filtered by suction, to the clear filtrate is added an equal quantity of watery picric acid solution, the precipitate is separated and suspended in alcohol acidulated with hydrochloric acid. By repeated washing, by centrifugation, with alcohol and finally with ether, there are obtained about 2,5 grams of a white amorphous powder which altogether dissolves in water and is almost free from ashes. This preparation contains 10 to 20 guinea pig units per milligram. Even large doses of a preparation do not show any effect on the germinal glands.

Further purification of the product is effected by dissolving 1 gram in 100 ccms. water, carefully adding to the solution n/10 caustic soda solution until a marked turbidity is produced and thereafter adding one more cubic centimetre n/10 caustic soda solution. After separation from the precipitate, the picric acid is added to the filtrate, and the active substance, which is freed from the picric acid by means of alcohol, is precipitated. The active substance has the form of a light, white water-soluble powder which shows only weak albumen reactions and contains up to 100 guinea pig units per milligram.

From the several waste liquors the gonadotropic hormone can be obtained by concentrating these liquors in vacuo at very low temperature, removing the picric acid in a well known manner and recovering the gonadotropic hormone by salting out.

Example 2

20 grams dried anterior lobes of the pituitary gland, which have been freed from fat, are shaken 24 hours with 10 grams kieselguhr and 300 ccms. of a 0.25% acetic acid. The clear filtrate is salted out by adding 40 grams ammonium sulfate to each 100 ccms. and separating the precipitate, which is then dissolved in acetic acid of ¼%, the undissolved parts being separated and the solution treated further with picric acid as described with reference to Example 1. There are thus obtained 70 milligrams of a white product readily dissolving in water, which contains about 20 guinea pig units per milligram.

Example 3

20 grams of the dry powdered product of the anterior lobe of the pituitary gland are treated for extraction as described with reference to Example 2. The clear filtrate is precipitated with 2% trichloro acetic acid. The precipitate is separated from the solution, washed with alcohol by centrifugation and finally dried with ether. There result 80 milligrams of a substance, such as obtained according to Example 2.

Example 4

The starting material referred to in Example 1 is extracted as described above. The filtrate is precipitated with an equal volume of saturated watery picrolonic acid. The precipitate, separated from the solution, is washed by centrifugation with hydrochloric alcohol, until it has lost its colour, whereupon all traces of hydrochloric acid are removed with the aid of alcohol and ether and the preparation is dried. There is thus obtained a product, such as obtainable in accordance with Example 1, the yield being substantially the same. Further purification can be effected as described in Example 1; the second precipitation may be effected either with picric acid or with picrolonic acid.

Example 5

To the raw gland extract produced according to Example 1 is added the quantity of watery 25% solution of sulfo salicylic acid, which is required for complete precipitation. The precipitate is washed with hydrochloric alcohol to remove all the sulfo salicylic acid and after washing is dried with ether. The resulting product, obtained with a slightly lower yield than in Example 1, is also slightly less efficient.

Example 6

The raw watery gland extract obtained according to Example 1, which may be made weakly alkaline, is precipitated with a sufficient quantity of a solution of acetate of lead, which may also be replaced by silver nitrate or by mercuric chloride. The precipitate obtained with lead acetate can be freed from lead by careful washing with acetic alcohol and purified further as described with reference to Example 1. Decomposition of the precipitate obtained with mercuric chloride is preferably effected with the aid of hydrochloric alcohol. The yield and degree of purity of the precipitates thus obtained are about the same as after the first precipitation with picric acid according to Example 1.

Example 7

A precipitate obtained with the aid of silver nitrate is preferably suspended in water and the silver precipitated with hydrochloric acid, care being taken to avoid the addition of a greater excess of the acid. From the filtrate the thyreotropic hormone, after having further been purified by precipitating the inert matter at the isoelectric point, can be precipitated with picric acid or picrolonic acid according to Example 1, or with a water-soluble organic solvent, such as alcohol or acetone. In all these cases there results the final product described with reference to Example 1, the yield being about the same.

Example 8

The extract serving as starting material recovered as described with reference to Example 1, is adjusted for pH=8 and precipitated with a quantity of colloidal ferric hydroxide diluted in the proportion of 1:10, which suffices for complete precipitation. The precipitate having been washed by centrifugation with slightly alkaline water is dissolved with hydrochloric acid in water, precipitated with alcohol or acetone and dried. The product resulting in this treatment still contains some iron, but after renewed dissolution in water most of the iron remains undissolved as hydroxide and can be separated by filtration. By repeated reprecipitation with alcohol preparations are recovered, which also contain 10 to 20 guinea pig units per milligram.

Example 9

To the watery or aqueous extract used as starting material according to Example 1, which is rendered slightly alkaline, is added aluminium hydroxide, obtained by exposing aluminium sheet amalgamated with mercuric chloride solution to oxidation in contact with air, the quantity added being just sufficient for the reaction. The precipitate separated from the liquid is dissolved with acetic acid in water and treated as described with reference to Example 8.

Various changes may be made in the details disclosed in the foregoing specification without departing from the invention or sacrificing the advantages thereof.

The acid precipitating agents employed in the above examples at the concentrations used have pH values below 3.

We claim:—

1. The method of recovering the thyreotropic hormone of the anterior lobe of the pituitary gland, comprising acting on an aqueous extract produced at ordinary temperature from the anterior lobes of pituitary glands with an acid of the group of acids constituted by picric acid, picrolonic acid, sulfo salicylic acid and trichloro acetic acid for the precipitation of albuminous matter, separating the precipitate from the adhering precipitating agent, and purifying the precipitate by reiterated precipitation, from a dilute alkaline solution, with the precipitating agent.

2. The method of recovering the thyreotropic hormone of the anterior lobe of the pituitary gland, comprising acting on an aqueous extract produced at ordinary temperature from the anterior lobes of pituitary glands with an agent capable of precipitating albumen, separating the precipitate from the adhering precipitating agent, taking the precipitate up with water and repeating the precipitation with an acid albumen-precipitating agent an aqueous solution of which has a pH value not exceeding 3, and the removal of this agent by washing with an organic solvent.

3. The method of recovering the thyreotropic hormone of the anterior lobe of the pituitary gland which comprises precipitating albumin containing said thyreotropic hormone from an aqueous extract of the anterior lobe of the pituitary gland, separating said precipitate from the surrounding liquid and purifying said precipitate by washing to remove adhering precipitant from said precipitate.

4. The method of recovering the thyreotropic hormone of the anterior lobe of the pituitary gland which comprises precipitating albumin containing said thyreotropic hormone from an aqueous extract of the anterior lobe of the pituitary gland produced at ordinary temperatures, separating said precipitate from the surrounding liquid and subsequently purifying said precipitate by washing with an organic solvent.

5. The method of recovering the thyreotropic hormone of the anterior lobe of the pituitary gland which comprises precipitating said thyreotropic hormone from an aqueous extract of the anterior lobe of the pituitary gland produced at ordinary temperatures by treating said aqueous extract with an albumin precipitating agent separating the precipitate so formed from the surrounding liquid and subsequently washing to remove adhering impurities.

6. The method of claim 5 wherein said precipitate purified by washing to remove adhering impurities is further purified by dissolving it in water, adjusting the solution so formed to the isoelectric point to cause a precipitation of inert matter of an albuminous nature, separating said inert matter by filtration and precipitating albumin containing thyreotropic hormone from said filtrate by treatment of the filtrate with an albumin precipitating agent.

7. The method of recovering the thyreotropic hormone of the anterior lobe of the pituitary gland which comprises precipitating albumin containing said thyreotropic hormone from an aqueous extract of the anterior lobe of the pituitary gland by treating said extract with an albumin precipitating agent soluble in organic solvents, removing the filtrate formed during said precipitation and further purifying said separated precipitate by treatment with an organic solvent.

8. A hormone product comprising a stable white powder capable of increasing the activity of the thyroid gland and which does not act on the germinal gland, said powder being water-soluble and capable of being precipitated from its aqueous solutions by means of picric acid, said powder being substantially free of impurities and free of any gonadotropic hormone, said product having an activity of at least 20 guinea pig units per milligram and being obtained by the process of claim 3.

WALTER SCHOELLER.
KARL JUNKMANN.